United States Patent
Morita

(10) Patent No.: US 10,461,569 B2
(45) Date of Patent: Oct. 29, 2019

(54) POWER PATH INFORMATION GENERATION DEVICE, METHOD FOR GENERATING POWER PATH INFORMATION, AND COMPUTER PROGRAM

(71) Applicant: SONY CORPORATION, Tokyo (JP)

(72) Inventor: Tadashi Morita, Tokyo (JP)

(73) Assignee: SONY CORPORATION, Tokyo (JP)

(*) Notice: Subject to any disclaimer, the term of this patent is extended or adjusted under 35 U.S.C. 154(b) by 290 days.

(21) Appl. No.: 15/324,013

(22) PCT Filed: Sep. 30, 2015

(86) PCT No.: PCT/JP2015/004982
§ 371 (c)(1),
(2) Date: Jan. 5, 2017

(87) PCT Pub. No.: WO2016/059758
PCT Pub. Date: Apr. 21, 2016

(65) Prior Publication Data
US 2017/0207652 A1     Jul. 20, 2017

(30) Foreign Application Priority Data
Oct. 15, 2014 (JP) .................. 2014-210515

(51) Int. Cl.
*H02J 7/35* (2006.01)
*H02J 7/34* (2006.01)
*H02J 13/00* (2006.01)
*G05B 15/02* (2006.01)

(52) U.S. Cl.
CPC ............. *H02J 7/35* (2013.01); *G05B 15/02* (2013.01); *H02J 7/34* (2013.01); *H02J 13/0003* (2013.01)

(58) Field of Classification Search
None
See application file for complete search history.

(56) References Cited

U.S. PATENT DOCUMENTS 9,106,098 B2 * 8/2015 Srinivasan .............. H02J 1/108
2012/0283891 A1 11/2012 Merkel et al.
2014/0039818 A1 2/2014 Arya et al.
2014/0288718 A1 9/2014 Nishibayashi et al.
(Continued)

FOREIGN PATENT DOCUMENTS

CN         104011957 A     8/2014
JP       2010-161923 A     7/2010
(Continued)

OTHER PUBLICATIONS

Office Action dated Mar. 6, 2018 in Japanese Patent Application No. 2014-210515.
(Continued)

*Primary Examiner* — David M. Gray
*Assistant Examiner* — Geoffrey T Evans
(74) *Attorney, Agent, or Firm* — Xsensus LLP

(57) ABSTRACT

A system that acquires information indicating a variation in voltage corresponding to each of a plurality of nodes connected to a direct-current (DC) line; and identifies a topology of the plurality of nodes connected to the DC line based on the acquired information indicating the variation in voltage corresponding to each of the plurality of nodes.

20 Claims, 9 Drawing Sheets

(56) References Cited

U.S. PATENT DOCUMENTS

| | | | | |
|---|---|---|---|---|
| 2015/0303692 A1* | 10/2015 | Spotti | ............... | H02J 3/32 |
| | | | | 307/19 |
| 2016/0248261 A1* | 8/2016 | Tokuda | ............... | H02J 3/14 |
| 2016/0329744 A1* | 11/2016 | Werth | ............... | H02J 1/10 |
| 2017/0163051 A1* | 6/2017 | Morita | ............... | H02J 1/10 |
| 2017/0229861 A1* | 8/2017 | Kawamoto | ............... | G06F 1/266 |

FOREIGN PATENT DOCUMENTS

| | | |
|---|---|---|
| JP | 2011-205871 A | 10/2011 |
| JP | 2013-90560 A | 5/2013 |
| JP | 2014-60855 A | 4/2014 |

OTHER PUBLICATIONS

Office Action dated May 22, 2018 in Japanese Patent Application No. 2014-210515.
International Search Report dated Jan. 5, 2016 in PCT/JP2015/004982 filed Sep. 30, 2015.
Japanese Office Action dated Jul. 25, 2017 in Patent Application No. 2014-210515 (without English Translation).
Chinese Office Action dated Apr. 25, 2019, issued in corresponding Chinese Application No. 201580054704X.

* cited by examiner

[Fig. 1]
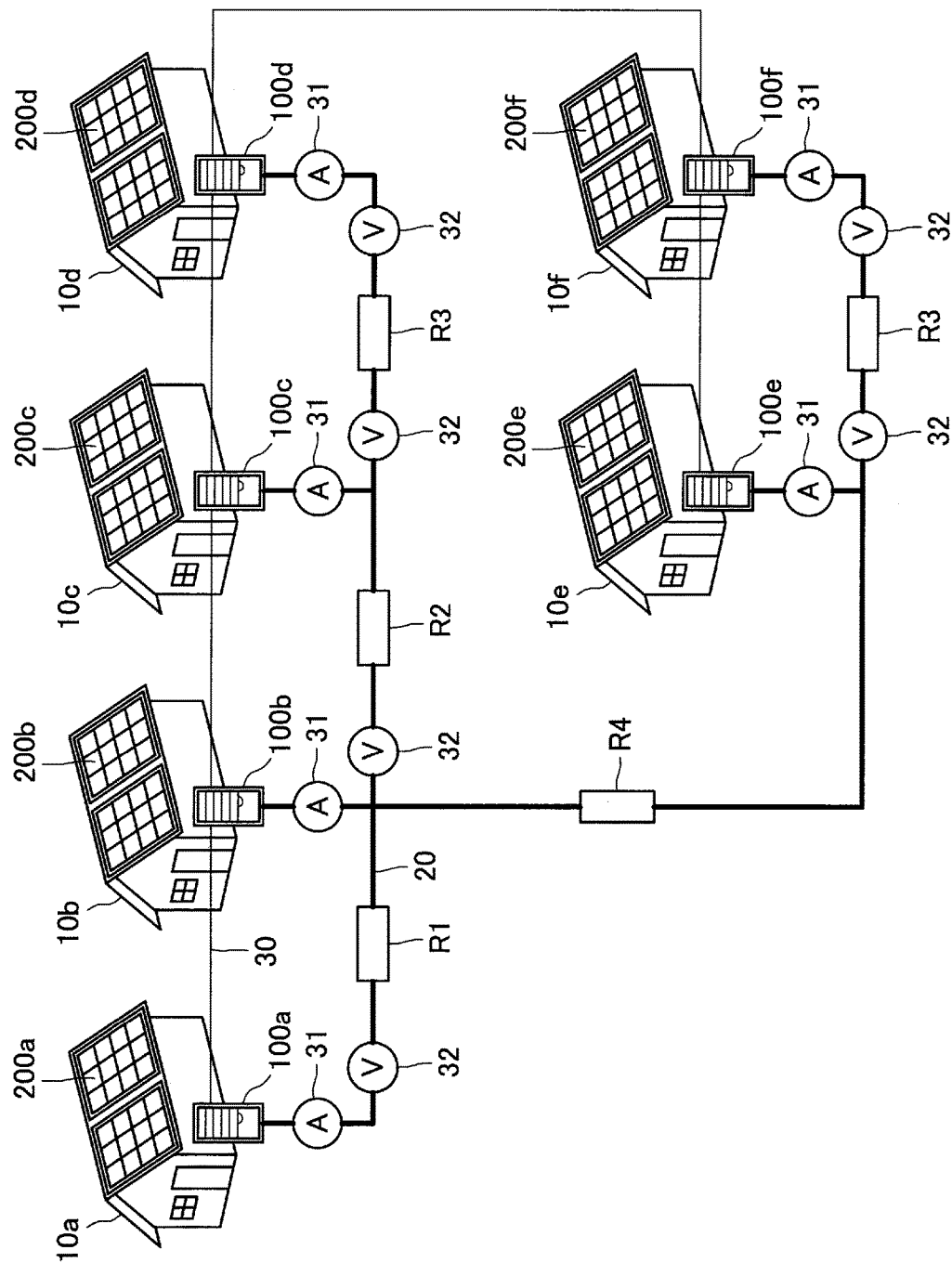

[Fig. 2]
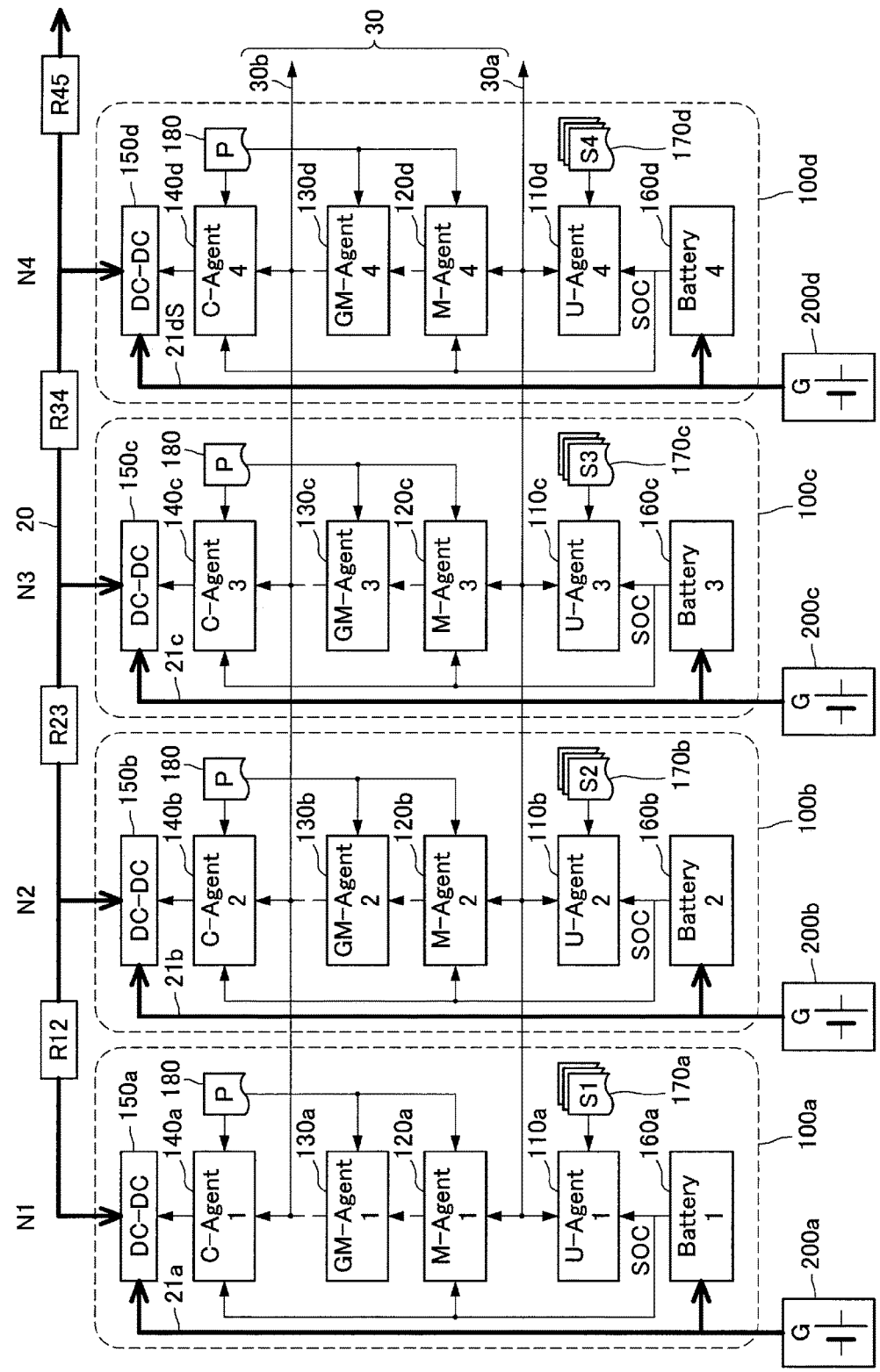

[Fig. 3A]
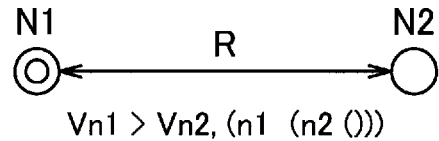
[Fig. 3B]
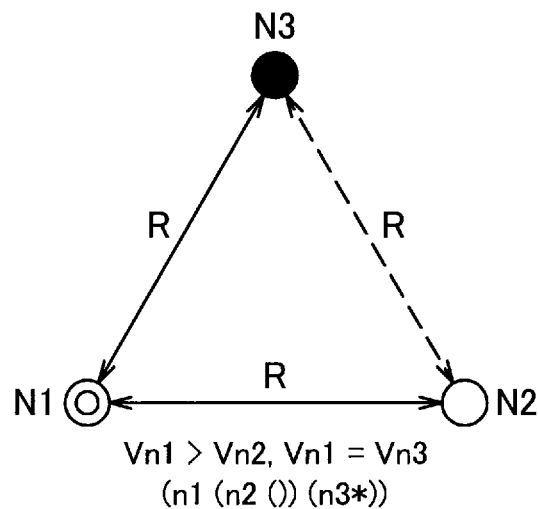
[Fig. 3C]
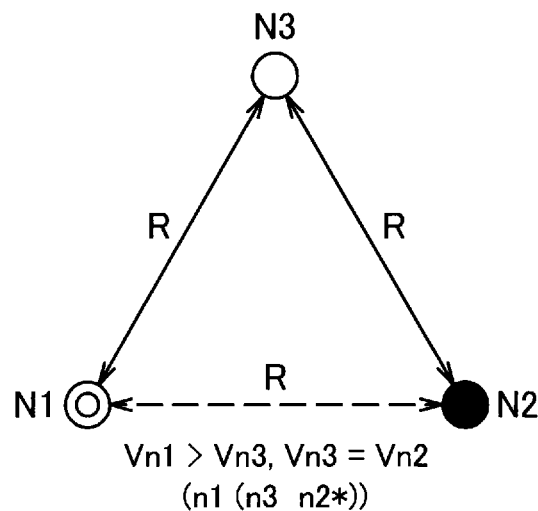

[Fig. 3D]
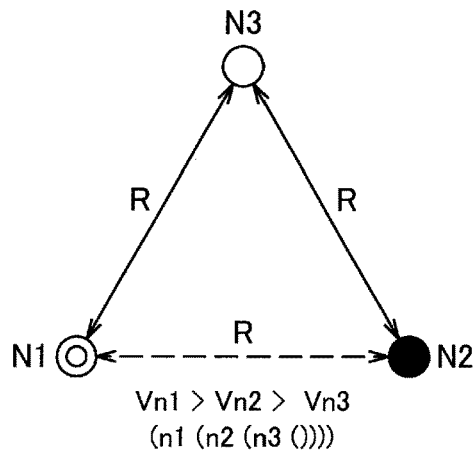
Vn1 > Vn2 > Vn3
(n1 (n2 (n3 ())))
[Fig. 3E]
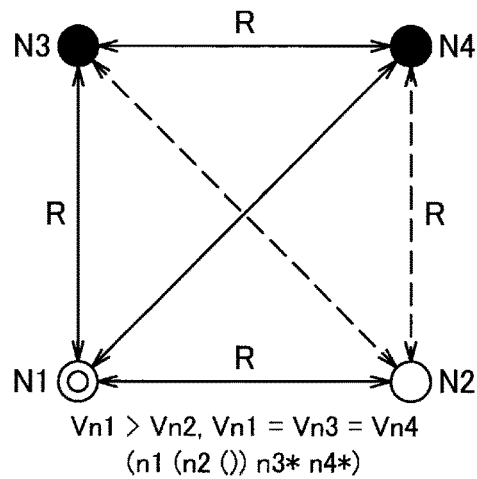
Vn1 > Vn2, Vn1 = Vn3 = Vn4
(n1 (n2 ()) n3* n4*)
[Fig. 3F]
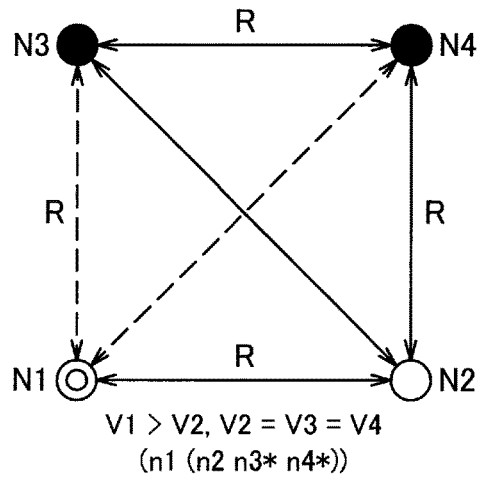
V1 > V2, V2 = V3 = V4
(n1 (n2 n3* n4*))

[Fig. 3G]
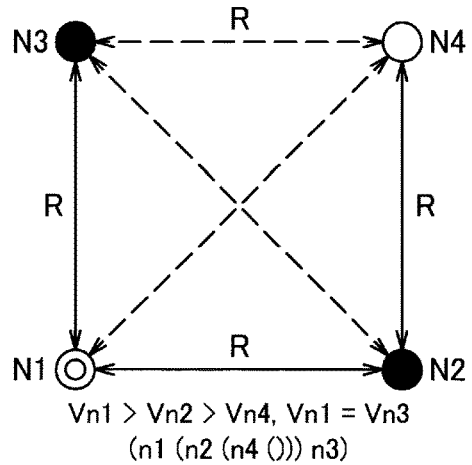
[Fig. 3H]
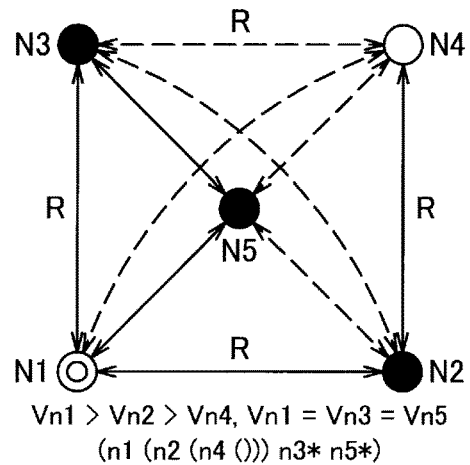
[Fig. 3I]
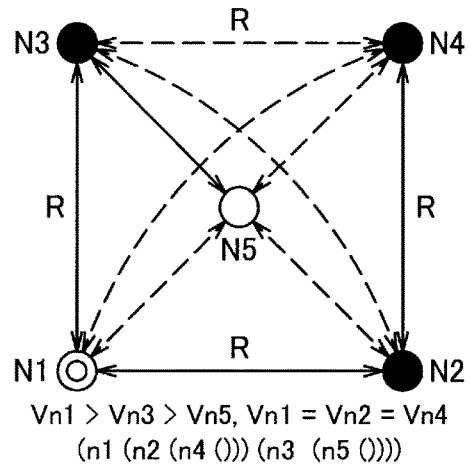

[Fig. 4]
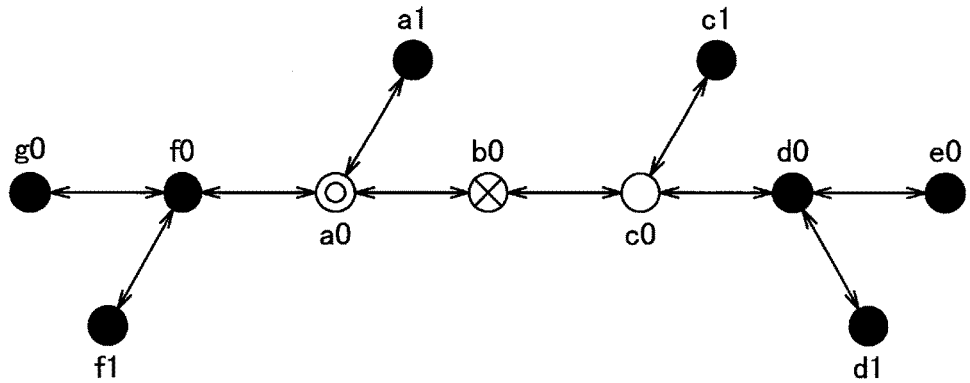
EXPRESSION 1
VIEWPOINT OF a0
(a0 (a1 ())
   (b0 (c0 (c1 ())
        (d0 (d1 ())
           (e0 ())
        )
     )
   )
   (f0 (f1 ())
     (g0 ())
   )
)
EXPRESSION 2
VIEWPOINT OF b0
(b0 (c0 (c1 ())
    (d0 (d1 ())
       (e0 ())
    )
  )
  (a0 (a1 ())
    (f0 (f1 ())
      (g0 ())
    )
  )
)
EXPRESSION 3
VIEWPOINT OF c0
(c0 (c1 ())
  (d0 (d1 ())
    (e0 ())
  )
  (b0 (a0 (a1 ())
    (f0 (f1 ())
      (g0 ())
    )
  )
)
EXPRESSION 4
VIEWPOINT OF f0
(f0 (a0 (b0 (c0 (c1 ())
      (d0 (d1 ())
        (e0 ())
      )
    )
  )
    (a1 ())
  )
  (f1 ())
  (g0 ())
)
EXPRESSION 5
VIEWPOINT OF a1
(a1 (a0 (b0 (c0 (c1 ())
      (d0 (d1 ())
        (e0 ()))
      )
    )
    (f0 (f1 ())
      (g0 ())
    )
  )
)

[Fig. 5]
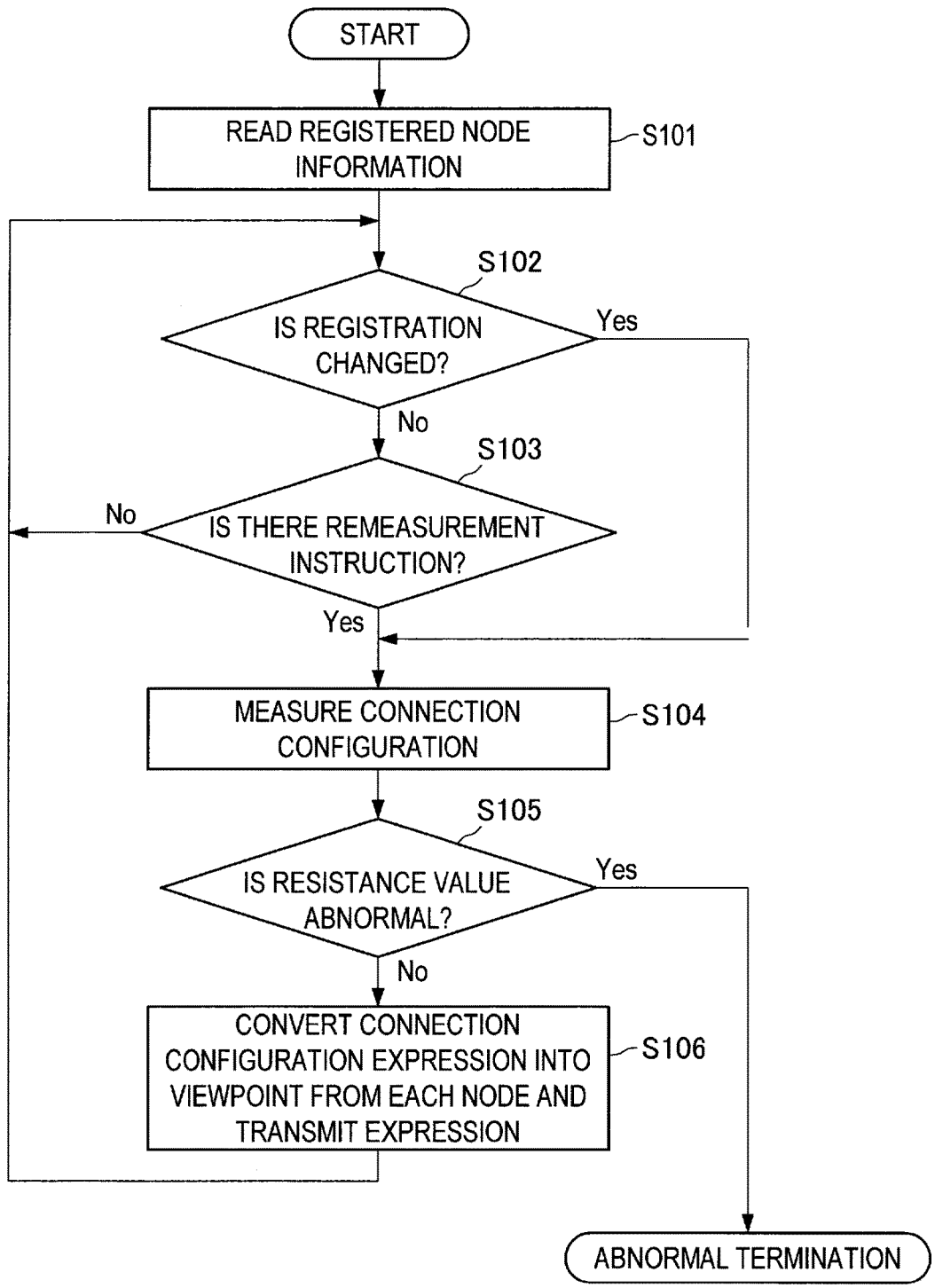

[Fig. 6]
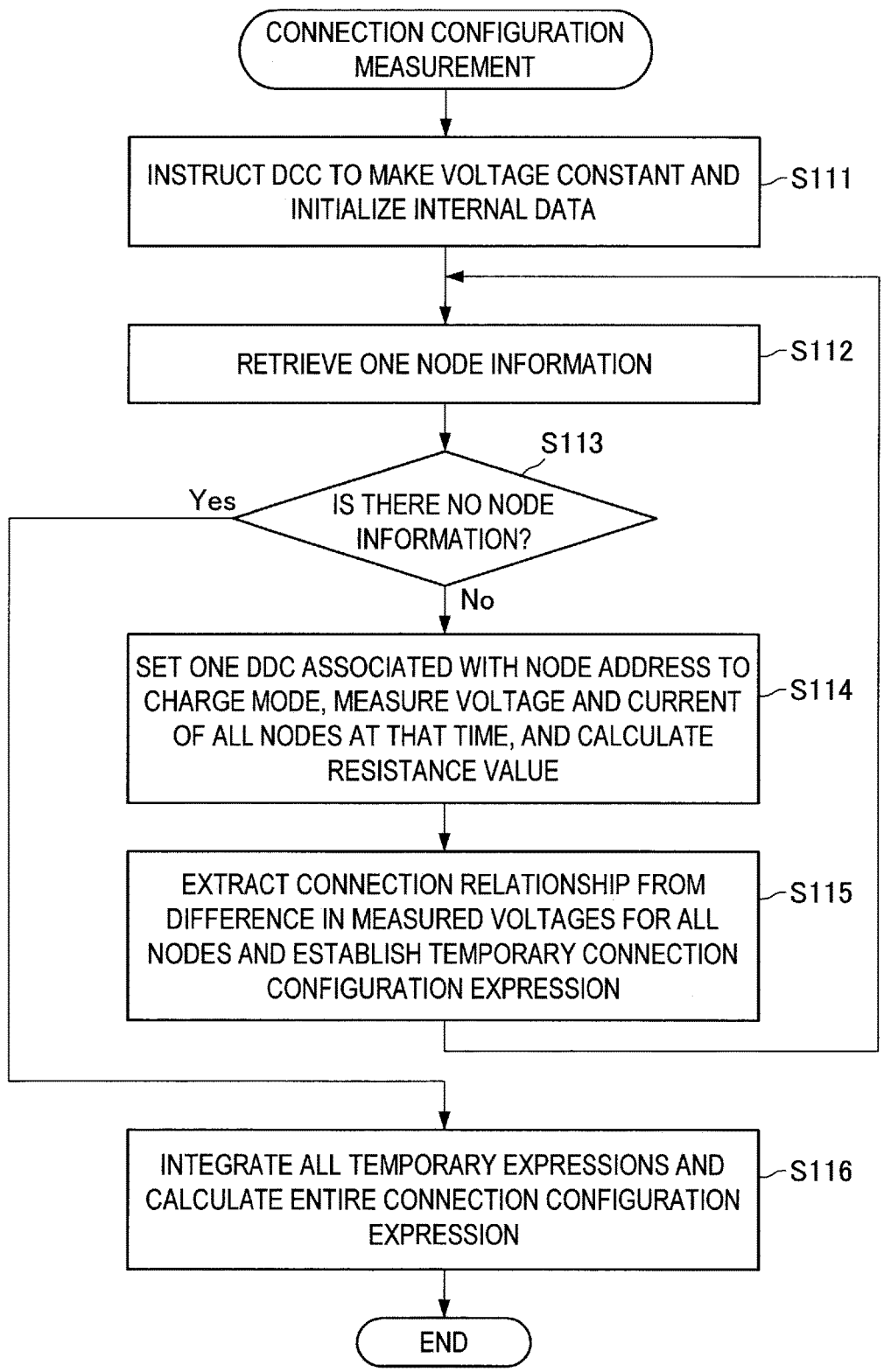

[Fig. 7]
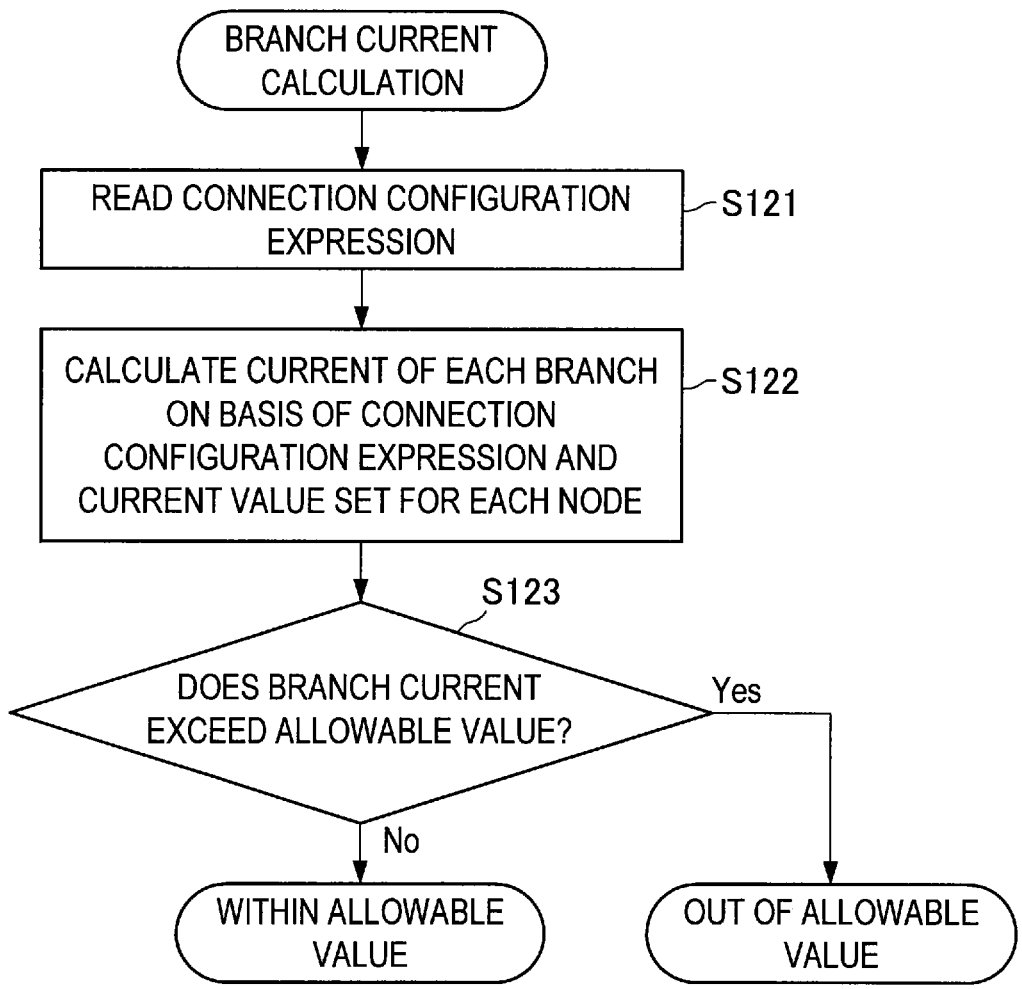

POWER PATH INFORMATION GENERATION DEVICE, METHOD FOR GENERATING POWER PATH INFORMATION, AND COMPUTER PROGRAM

CROSS REFERENCE TO RELATED APPLICATIONS

This application claims the benefit of Japanese Priority Patent Application JP 2014-210515 filed Oct. 15, 2014, the entire contents of which are incorporated herein by reference.

TECHNICAL FIELD

The present disclosure relates to a power path information generation device, a method for generating power path information, and computer program.

BACKGROUND ART

There is known an uninterruptible power supply provided with a storage battery for continuing to provide power from the storage battery to equipment connected thereto for a predetermined time without causing power failure even when the power from an input power source is interrupted. Techniques are developed for extending such a power supply into each consumer and supplying power to the consumers when an abnormality occurs in supplying power due to power failure, shortage of storage battery capacity, or other reasons (see PTLs 1 and 2).

CITATION LIST

Patent Literature

PTL 1: JP 2011-205871A
PTL 2: JP 2013-090560A

SUMMARY

Technical Problem

When customers supply power to each other, it is desirable, for the sake of efficiency, to supply direct-current power in consideration of supply of power from a storage battery. When customers supply direct-current power to each other, knowing the connection topology of a node that transmits and receives the direct-current power leads to efficient power transmission. In this case, the connection topology may vary dynamically, and thus information on a changed connection topology for every change in connection topology is necessary to be collected and distributed to each node, which is inefficient.

Therefore, according to an embodiment of the present disclosure, there is provided a novel and improved power path information generation device, method for generating power path information, and computer program, capable of achieving an efficient transmission of direct-current power by automatically collecting the connection topology of a node that transmits and receives the direct-current power.

Solution to Problem

According to an embodiment of the present disclosure, there is provided a system including circuitry configured to acquire information indicating a variation in voltage corresponding to each of a plurality of nodes connected to a direct-current (DC) line; and identify a topology of the plurality of nodes connected to the DC line based on the acquired information indicating the variation in voltage corresponding to each of the plurality of nodes.

According to an embodiment of the present disclosure, there is provided one or more non-transitory computer-readable media including computer program instructions, which when executed by a system cause the system to: acquire information indicating a variation in voltage corresponding to each of a plurality of nodes connected to a direct-current (DC) line; and identify a topology of the plurality of nodes connected to the DC line based on the acquired information indicating the variation in voltage corresponding to each of the plurality of nodes.

According to an embodiment of the present disclosure, there is provided method performed by an information processing system, the method including: acquiring information indicating a variation in voltage corresponding to each of a plurality of nodes connected to a direct-current (DC) line; and identifying a topology of the plurality of nodes connected to the DC line based on the acquired information indicating the variation in voltage corresponding to each of the plurality of nodes.

Advantageous Effects of Invention

According to the embodiments of the present disclosure as described above, it is possible to provide a novel and improved power path information generation device, method for generating power path information, and computer program, capable of achieving an efficient transmission of direct-current power by automatically collecting the connection topology of a node that transmits and receives the direct-current power.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram illustrated to describe an overall configuration example of a power transmission and reception control system according to an embodiment of the present disclosure.

FIG. 2 is a diagram illustrated to describe a functional configuration example of the power transmission and reception control system according to an embodiment of the present disclosure.

FIG. 3A is a diagram illustrated to describe an example of the created connection configuration expression.

FIG. 3B is a diagram illustrated to describe an example of the created connection configuration expression.

FIG. 3C is a diagram illustrated to describe an example of the created connection configuration expression.

FIG. 3D is a diagram illustrated to describe an example of the created connection configuration expression.

FIG. 3E is a diagram illustrated to describe an example of the created connection configuration expression.

FIG. 3F is a diagram illustrated to describe an example of the created connection configuration expression.

FIG. 3G is a diagram illustrated to describe an example of the created connection configuration expression.

FIG. 3H is a diagram illustrated to describe an example of the created connection configuration expression.

FIG. 3I is a diagram illustrated to describe an example of the created connection configuration expression.

FIG. 4 is a diagram illustrated to describe an example of topology of a node in a DC grid and an example of a connection configuration expression as viewed from each node.

FIG. 5 is an exemplary operation of a battery server according to an embodiment of the present disclosure.

FIG. 6 is an exemplary operation of a battery server according to an embodiment of the present disclosure.

FIG. 7 is an exemplary operation of a battery server according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Embodiment of present Disclosure
1.1. Overview
1.2. Exemplary System Configuration
1.3. Exemplary Operation
2. Conclusion

1. EMBODIMENT OF PRESENT DISCLOSURE (1.1. Overview)

An overview of an embodiment of the present disclosure will be described prior to the description of an embodiment of the present disclosure.

The description is based on the assumption that an environment becomes increasingly popular in which each consumer is provided with a battery server having a storage battery, the storage battery stores power using a commercial power supply or power generated from a natural energy source such as solar, wind, and geothermal, and the power stored in the storage battery drives electrical appliances. With the spread of such environment, a power interchange system is designed for interchanging power between consumers, as described above. When power is insufficient in a battery server of a consumer, the power interchange system allows a battery server of a consumer having extra power to supply power to the battery server of the consumer having insufficient power. When consumers supply power to each other, it is preferable, for the sake of efficiency, to supply direct-current power in consideration of the supply of power from a storage battery.

When customers supply direct-current power with each other, it is preferable to previously determine the amount of power transmission exchanged between the power transmission side and the power reception side. The predetermined amount of power is necessary to be properly supplied between the power transmission side and the power reception side. This is because the transmission and reception of the proper amount of power between the power transmission side and the power reception side are necessary to exchange power between the power transmission side and the power reception side.

When customers supply direct-current power with each other, if the connection topology of each customer (node) is known in advance, it is possible to supply direct-current power with less loss of power transmission. The reasons for this are summarized as follows.

For example, the existing alternating-current power grid (AC grid) is intended to supply power from a power company to each home in a one-way direction, the distribution wiring is made using power lines that sufficiently withstand the total amount of power consumed in each home. However, as the number of power supply contracts is increased, it becomes necessary to use a material of wiring in consideration of the maximum number of contracts as a power transmission line, which leads to an increased cost.

As is the case with the AC grid, this is similarly applicable to the direct-current power grid (DC grid). In the case of a DC grid, the flow of current in both directions rather than a single direction and the sequential addition of newly contracted customers are assumed. Thus, in the case of a DC grid, a power transmission line having a constant capacity is desirably used as a power line of home connected to the terminal end, and it is necessary to reduce the cost of a power transmission line by optimizing the maximum transmission power.

A power cable of at least approximately 50 meters in length may be necessary between home (customers) connected to each other in the DC grid, or some power cables may be up to several hundred meters in length. In such a situation, efficient selection of a power supply destination is necessary to consider power loss that depends on parasitic resistance of the cable. However, the positional relationship between customers is necessary to know to allow for determination of selection of the power supply destination.

A method of previously checking a connection state by a system administrator in a visual manner, measuring or calculating parasitic resistance value between wires, and re-registering the parasitic resistance value in each device can be considered. However, in a power supply system employing the DC grid as described below, customers can join the system and withdraw from it of their own free will. Thus, it is necessary to check the connection configuration and change a setting whenever customers join the system or withdraw from it.

Furthermore, for example, even when a failure occurs in a part of the DC grid and a diversion route is set up to separate the part where the failure occurs, it takes time to check the connection configuration again and to set up information on it for each battery server, resulting in difficulties in restoring it in a short time.

The present inventor has made intensive studies to provide a technology capable of detecting automatically a connection state by a battery server connected to the DC grid and sharing the detected connection state with another battery server. As a result, the present inventor has developed the technology capable of detecting automatically a connection state by a battery server connected to the DC grid and sharing the detected connection state with another battery server as described below.

An overview of an embodiment of the present disclosure has been described. Next, a functional configuration example of the power transmission and reception control system according to an embodiment of the present disclosure will be described.

(1.2. Exemplary System Configuration)

FIG. 1 is a diagram illustrated to describe an overall configuration example of the power transmission and reception control system according to an embodiment of the present disclosure. FIG. 1 illustrates an overall configuration example of the power transmission and reception control system that interchanges direct-current power between battery servers having their own storage batteries. An overall configuration example of the power transmission and reception control system according to an embodiment of the present disclosure will be described with reference to FIG. 1.

As shown in FIG. 1, the power transmission and reception control system 1 is constructed to mutually supply direct-current power as necessary among battery servers provided in the respective consumers (six in FIG. 1). A consumer 10a is provided with a battery server 100a. Similarly, a consumer 10e is provided with a battery server 100e, and a consumer 10f is provided with a battery server 100f. Each of the battery servers 100a to 100f has a rechargeable battery provided inside or outside of each battery server.

The battery servers 100a to 100f are connected to a direct-current bus line 20 over which direct-current power is mutually supplied among the battery servers as necessary. Each of the battery servers 100a to 100f is provided with a bidirectional DC-to-DC converter that converts voltage of a battery and voltage of the direct-current bus line 20 from one level to another. The battery servers 100a to 100f are connected to a communication wire 30. When the battery servers 100a to 100f mutually supply direct-current power over the direct-current bus line 20, the battery servers 100a to 100f transmit and receive information over the communication wire 30. The communication wire 30 is illustrated as being wired in FIG. 1, but the communication wire 30 may be wireless.

The consumers 10a to 10f may be provided with solar panels 200a to 200f, respectively. Each of the solar panels 200a to 200f receives irradiation of sunlight and generates electric power. The solar panels 200a to 200f are configured so that the generated electric power may be stored in the respective batteries provided in the battery servers 100a to 100f. The electric power stored in the battery servers 100a to 100f may be generated by natural energy, such as wind or geothermal, other than sunlight.

The power transmission and reception control system 1 according to the present embodiment is characterized by a mechanism for arbitrating power transmission and reception among the battery servers 100a to 100f in such a way that only one of the battery servers 100a to 100f connected to the direct-current bus line 20 has the right to control the transmission and reception of direct-current power over the direct-current bus line 20. In other words, the power transmission and reception control system 1 according to the present embodiment is configured to have a mechanism that allows only the batter server having the control right among the battery servers 100a to 100f to instruct other battery servers to transmit power stored in their own batteries or to receive power for charging their own batteries, and that prevents a battery server having no control right from performing the power transmission and reception without permission or instruction.

In this way, only one of the battery servers 100a to 100f connected to the direct-current bus line 20 has the right to control the transmission and reception of direct-current power to and from other battery servers over the direct-current bus line 20. This makes it possible for the power transmission and reception control system 1 according to the present embodiment to avoid phenomena caused when the roles are simply shared between a master and a slave as described above and to efficiently manage the right to control the power transmission and reception of direct-current power. The power transmission and reception control system 1 according to the present embodiment efficiently manages the right to control the power transmission and reception of direct-current power, thereby keeping the order of objects to be controlled among the battery servers.

The battery servers 100a to 100f are configured to acquire a current value from an ammeter 31 and a voltage value from a voltmeter 32. The current value and the voltage value are measured at the points connected to the direct-current bus line 20. The ammeter 31 and the voltmeter 32 may be provided in the DC-to-DC converter, which will be described later. The battery servers 100a to 100f exchange information on the current value and the voltage value with each other via the communication wire 30. The battery servers 100a to 100f control their respective bidirectional DC-to-DC converters based on the information on the current value and the voltage value.

An overall configuration example of the power transmission and reception control system according to an embodiment of the present disclosure has been described with reference to FIG. 1. Subsequently, a functional configuration example of the power transmission and reception control system according to an embodiment of the present disclosure will be described.

FIG. 2 is a diagram illustrated to describe a functional configuration example of the power transmission and reception control system according to an embodiment of the present disclosure. A functional configuration example of the power transmission and reception control system according to an embodiment of the present disclosure will be described with reference to FIG. 2.

As shown in FIG. 2, the battery server 100a is configured to include a U-Agent 110a, an M-Agent 120a, a GM-Agent 130a, a C-Agent 140a, a DC-to-DC converter 150a, and a battery 160a. The battery servers 100b, 100c, and 100d have a configuration similar to the battery server 100a. The components that constitute the battery server 100a will be described.

As described in FIG. 2, the communication wire 30 is composed of two paths (channels) including a communication wire 30a and a communication wire 30b. The communication wires 30a and 30b may be physically different wired communication wires, or may be physically identical wired or wireless communication wires, which are divided logically for authentication, encryption, or the like. As shown in FIG. 2, the communication wire 30a allows the U-Agent 110a to communicate with other U-Agents 110b to 110d, and the M-Agent 120a to communicate with other M-Agents 120b to 120d. The communication wire 30b allows the GM-Agent 130a to communicate with other GM-Agents 130b to 130d, and the C-Agent 140a to communicate with other C-Agents 140b to 140d.

The power transmission and reception control system 1 according to the present embodiment uses separate communication wires for the U-Agent 110a and the M-Agent 120a and for the GM-Agent 130a and the C-Agent 140a. As a result, the U-Agent 110a and the M-Agent 120a are prevented from directly sending an instruction to the GM-Agent 130a and the C-Agent 140a. The GM-Agent 130a and the C-Agent 140a are also prevented from directly sending an instruction to the U-Agent 110a and the M-Agent 120a.

The U-Agent 110a periodically checks the state of charge (SOC) in the battery 160a. If the state of charge in the battery 160a satisfies a predetermined condition, the U-Agent 110a requests the M-Agent 120a to receive power. The request to be sent from the U-Agent 110a to the M-Agent 120a may include a voltage value or current value upon reception of power, a time for receiving power (e.g., start time, end time, and duration), and a state of charge in the battery 160a that stops receiving power.

The U-Agent 110a refers to a scenario 170a to determine whether the state of charge in the battery 160a satisfies a predetermined condition. The scenario 170a describes a condition of the state of charge in the battery 160a, which is used to request the M-Agent 120a to receive power from the U-Agent 110a. The condition described in the scenario 170a may include contents of the U-Agent 110a requesting the M-Agent 120a to receive power if the state of charge in the battery 160a is lower than or equal to 20%.

The U-Agent 110a may have a function that edits contents of the scenario 170a based on the request from the user. The contents of the scenario 170a may be described in text, a markup language such as extensible markup language (XML), or a scripting language such as Lisp, Perl, and PHP. When the contents of the scenario 170a are described in a scripting language, the contents of the scenario 170a may be described in a set of functions.

The scenario 170a may be edited using a text editor, a dedicated editor, or a web browser. The U-Agent 110a may be configured so that a tool capable of editing the contents of the scenario 170a is operable.

When there is a request for supply of power from another battery server, the scenario 170a may describe a way of determining whether power transmission is permitted in response to the request depending on what condition is satisfied. For example, when there is a request for supply of power from another battery server, the scenario 170a may describe contents in which power transmission is permitted in response to the request under the condition that the state of charge in the battery 160a is greater than or equal to 80%. For example, when there is a request for supply of power from another battery server, the scenario 170a may describe contents in which power transmission is permitted in response to the request under the condition that the state of charge in the battery 160a is greater than or equal to 80% and the usage rate per hour of the power is less than or equal to 10%. In other words, the condition described in the scenario 170a may include not only the state of charge in the battery 160a but also the state of usage of electric power stored in the battery 160a.

The contents of the scenario are possible to be defined independently at the respective batteries. Accordingly, the condition in which power reception is requested or the condition in which power transmission is permitted in response to a request for supply of power from another battery server may be different for each battery server. The number of scenarios to be defined at each battery server is not limited to only one. The scenario referred to by the U-Agent 110a may be switched into another, depending on the situation.

When the M-Agent 120a receives a request for power reception from the U-Agent 110a, the M-Agent 120a inquires of the M-Agents 120b, 120c, and 120d of other battery servers about whether they are allowed to transmit power by performing communication among the M-Agents 120b, 120c, and 120d via the communication wire 30a. When the M-Agent 120a receives an inquiry about whether the M-Agent 120a is allowed to transmit power from the M-Agents 120b, 120c, and 120d of other battery servers, the M-Agent 120a responds that power is allowed to be transmitted or not.

When the M-Agent 120a receives an inquiry as to whether the M-Agent 120a is allowed to transmit power from the M-Agents 120b, 120c, and 120d of other battery servers, the M-Agent 120a may respond that power is allowed to be transmitted. In this case, if the GM-Agent 130a is not started, the M-Agent 120a inquires of the M-Agents 120b, 120c, and 120d of other battery servers about whether the GM-Agents 130b, 130c, and 130d are started over the communication wire 30a. As will be described in detail later, the GM-Agent 130a is started based on the start instruction from the M-Agent 120a and controls the operation of the DC-to-DC converters 150a to 150d of the battery servers.

In the power transmission and reception control system 1 according to the present embodiment, only one of the GM-Agents 130a to 130d is permitted to start. Thus, when the GM-Agent 130a is not started, the M-Agent 120a determines that the battery server 100a does not have the right to control the power transmission and reception and inquires of the M-Agents 120b, 120c, and 120d of other battery servers about whether they have the right to control the power transmission and reception, that is, whether they are starting or not, over the communication wire 30a. If there is a GM-Agent being started, the M-Agent 120a requests the GM-Agent being started to transmit and receive power through the M-Agent that causes the GM-Agent to start. For example, if the GM-Agent 130b is being started, the M-Agent 120a requests the M-Agent 120b to transmit and receive power through the M-Agent 120b.

On the other hand, if there is an inquiry about whether the power transmission is possible or not from the M-Agents 120b, 120c, and 120d of other battery servers, it may be responded that the power transmission is possible. In this case, if the GM-Agent 130a is started, the fact that the GM-Agent 130a is started is responded together.

The M-Agent 120a notifies the C-Agent 140a to follow an instruction only from a GM-Agent of the battery server having a control right. For example, the M-Agent 120a notifies identification information, which identifies a GM-Agent of the battery server having a control right, to the C-Agent 140a. when the C-Agent 140a receives the notification of identification information that identifies a GM-Agent of the battery server having a control right, the C-Agent 140a may ignore an instruction from a GM-Agent that contains identification information other than the identification information.

The GM-Agent 130a is started and activated according to a start instruction from the M-Agent 120a. The GM-Agent 130a is stopped and deactivated according to a stop instruction from the M-Agent 120a. The activated GM-Agent 130a controls the power transmission and reception by the DC-to-DC converters 150a to 150d through the C-Agents 140a to 140d over the communication wire 30b based on the request for the power transmission and reception from the M-Agents 120a to 120d. When the requested power transmission and reception is all ended, the GM-Agent 130a performs a process for releasing the control right. When the control right is released, the GM-Agent 130a is stopped and deactivated according to the stop instruction from the M-Agent 120a.

When there is a request for the power transmission and reception from the M-Agents 120a to 120d, the GM-Agent 130a acquires the power transmission capacity and power reception capacity of the respective battery servers 100a to 100d from the C-Agents 140a to 140d over the communication wire 30b. The GM-Agent 130a also calculates an amount of electric current that can be transmitted, from the total transmission current amount of the direct-current bus line 20. When the accumulated power transmission amount reaches a desired power transmission amount after power transmission is started, the GM-Agent 130a instructs the C-Agents 140a to 140d to stop transmitting power over the communication wire 30b.

The C-Agent 140a controls the DC-to-DC converter 150a based on an instruction from the activated (i.e. having a control right) GM-Agent among the GM-Agents 130a to 130d. The C-Agent 140a receives the notification from the M-Agent 120a to follow the instruction only from the GM-Agent of the battery server having the control right. Thus, the C-Agent 140a controls the DC-to-DC converter 150a according to the instruction only from the GM-Agent of the battery server having the control right.

The C-Agent 140a periodically checks a parameter of the DC-to-DC converter 150a, and warns a target transmitter or receiver of power upon occurrence of an abnormality in the parameter of the DC-to-DC converter 150a.

The DC-to-DC converter 150a is connected between the battery 160a or the solar panel 200a and a local bus line 21a, and is connected to the DC-to-DC converters 150b to 150d of the other battery servers 100b to 100d over the direct-current bus line 20. The DC-to-DC converter 150a converts a direct-current power between the direct-current bus line 20 and the local bus line 21a under the control by the C-Agent 140a.

The U-Agent 110a operates according to the scenario 170a defined independently in the respective battery servers 100a to 100d. The M-Agent 120a, the GM-Agent 130a, and the C-Agent 140a operate according to a common policy 180 to all of the battery servers 100a to 100d. Thus, the M-Agent 120a, the GM-Agent 130a, and the C-Agent 140a are not allowed to operate according to different rules of the other battery servers 100b to 100d.

The contents of the policy 180 may be described in a text, a markup language such as extensible markup language (XML), or a scripting language such as Lisp, Perl, and PHP. When the contents of the policy 180 are described in a scripting language, the contents of the scenario 170a may be described in a set of functions.

The policy 180 may be edited using a text editor, a dedicated editor, or a web browser. As described above, the policy 180 is commonly referred to by all of the battery servers 100a to 100d, and thus it is desirable that the user is unable to edit easily, but it may be possible that the user can edit as necessary. The M-Agent 120a, the GM-Agent 130a, or the C-Agent 140a may edit the policy 180 based on the rule defined in the policy 180.

Examples of the contents described in the scenario 170a may include as follows:
  State of charge (SOC) level to request supply of power
  SOC level to determine that power is able to be supplied
  Method of predicting and calculating battery residual amount with power consumption cycle in a day
  Technique of predicting and calculating power generation amount in a week depending on acquisition of weather information
  Calculation of reduction in AC power usage depending on power interchange Examples of the contents described in the policy 180 may include a document version, date of modification, rule in modifying described contents, and respective rules defined for the M-Agents 120a to 120d, the GM-Agents 130a to 130d, and the C-Agents 140a to 140d.

Examples of rules defined for the M-Agents 120a to 120d may include as follows:
  Determination condition and decision procedure for acquiring control right
  Decision procedure for appeal from other devices
  Procedure of checking survival of battery server joined in the power transmission and reception control system 1
  Procedure of deleting registration of battery server previously joined in the power transmission and reception control system 1
  List and authentication information of members joined in the power transmission and reception control system 1

Examples of the determination condition for acquiring a control right may include a condition in which a control right can be acquired if there is even one M-Agent being in favor and a condition in which a control right can be acquired if a majority is in favor. Examples of the decision procedure for acquiring a control right may include a decision procedure in which a command is transmitted to other M-Agents in broadcast mode to acquire a control right and whether the control right is acquired is determined based on the response from the other M-Agent that returned an answer in a predetermined time. Similarly, examples of the decision procedure for appeal from other devices may include a decision procedure in which a command is transmitted to other M-Agents to acquire a control right and whether the control right is acquired is determined based on the contents of appeal from the other M-Agent that returned an answer in a predetermined time.

Examples of the procedure of checking survival of a battery server joined in the power transmission and reception control system 1 may include an example where the M-Agent of the battery server which is the last one to acquire a control right checks whether other battery servers are survived.

Examples of the procedure of deleting registration of a battery server previously joined in the power transmission and reception control system 1 may include a procedure of deleting registration information described in the policy 180 based on the command for requesting the deletion.

The list and authentication information of members joined in the power transmission and reception control system 1 are described in the policy 180, and thus the M-Agent can transmit various command only to the joined member and can add authentication information upon transmission of the command. Examples of the authentication information of a member may include address information of each battery server and an authentication key that is common to the battery servers.

Examples of rules defined for the GM-Agents 130a to 130d may include as follows:
  Information on connection state of battery servers as viewed from their position
  Method of calculating current capacity based on information on connection state of each battery server
  Control procedure and limitations of DC-DC converter
  Procedure from start to end for power transmission and reception in each battery server
  Abandonment or transfer procedure of control right after supply of power is stopped
  Processing procedure when abnormality is notified The direct-current power flows in the direct-current bus line 20, and thus the GM-Agents 130a to 130d are necessary to know the connection state of the battery servers 100a to 100d to the direct-current bus line 20 and to determine how to supply power based on position information of the battery servers 100a to 100d. The connection state of the battery servers 100a to 100d to the direct-current bus line 20 is described in the policy 180, and thus the GM-Agents 130a to 130d refer to the connection state to control the DC-to-DC converters 150a to 150d.

Examples of the procedure of controlling a DC-to-DC converter may include contents of an instruction sent to the DC-to-DC converter when direct-current power is converted. Examples of the limitations of a DC-to-DC converter may include a range in which power can be converted.

Examples of the procedure from start to end for power transmission and reception in each battery server may include a procedure of increasing electric current at the start of the power transmission or reception and a procedure of decreasing electric current at the end of the power transmission or reception.

Examples of the abandonment or transfer procedure of a control right after supply of power is stopped may include a procedure in which, for example, if there is another battery server that supplies power, the control right is transferred to the other battery server.

Examples of the processing procedure when abnormality is notified may include a procedure in which, if a batter server has a failure, the failed battery server is ignored and the processing proceeds.

Examples of rules defined for the C-Agents 140a to 140d may include as follows:

Procedure of checking whether it is continued to be controlled by a GM-Agent of a battery server having the control right and processing procedure upon occurrence of abnormality Procedure of checking whether it is controlled simultaneously by a plurality of GM-Agents Processing procedure when it is controlled simultaneously by a plurality of GM-Agents Monitoring procedure of checking operations of a DC-to-DC converter and appropriately notifying the check results to a GM-Agent of a battery server having the control right Examples of the procedure of checking whether it is continued to be controlled by a GM-Agent of a battery server having a control right may include a procedure of checking whether it is controlled by the GM-Agent at predetermined time intervals. Examples of the processing procedure upon occurrence of abnormality may include a procedure of notifying the GM-Agent of a battery server having a control right that control by the GM-Agent is interrupted for more than a predetermined time.

Examples of the procedure of checking whether it is controlled simultaneously by a plurality of GM-Agents may include a procedure of checking whether it is controlled by a GM-Agent having identification information different from that notified from the M-Agent. Examples of the processing procedure when it is controlled simultaneously by a plurality of GM-Agents may include a procedure of ignoring the control by the GM-Agent having identification information different from that notified from the M-Agent and notifying a GM-Agent of a battery server having a control right that it is controlled simultaneously by a plurality of GM-Agents by dealing with the control from all of the GM-Agents as errors.

Examples of the monitoring procedure of checking operations of a DC-to-DC converter and appropriately notifying the check results to a GM-Agent of a battery server having the control right may include a procedure of checking a parameter of a DC-to-DC converter at predetermined time intervals and notifying a parameter of the DC-to-DC convert to a GM-Agent of a battery server having the control right.

The policy 180 defined as described above allows the C-Agents 140a to 140d to send an instruction to stop transmitting power to the DC-to-DC converters 150a to 150d immediately when the instruction from the GM-Agent violates the contents of the policy 180.

The description contents of the above scenario 170a or the policy 180 and examples of the description contents of the above scenario 170a or the policy 180 are not limited to those described above. The description contents of the scenario 170a or the policy 180 may be appropriately changed depending on the configuration of the power transmission and reception control system 1 or the configuration of each of the battery servers 100a to 100d.

The battery 160a is composed of a rechargeable secondary battery. The battery 160a may be charged with power generated by the solar panel 200a or power supplied from the commercial supply of power (not shown). The battery 160a may be charged with power supplied from other battery servers 100b to 100d as necessary. The power stored in the battery 160a may be supplied to electric appliances such as air conditioner, refrigerator, washing machine, television set, and microwave, provided in the consumer 10a. The power stored in the battery 160a may be supplied from the DC-to-DC converter 150a to other battery servers 100b to 100d depending on the request from the other battery servers 100b to 100d.

The battery servers 100a to 100d according to an embodiment of the present disclosure have the configuration as shown in FIG. 2, and thus only one battery server of them having a control right can control power transmission and reception of direct-current power to and from the other battery servers over the direct-current bus line 20. The battery servers 100a to 100d according to an embodiment of the present disclosure have the configuration as shown in FIG. 2, and thus it is possible to avoid phenomena caused when the roles are simply shared between a master and a slave as described above and to efficiently manage the right to control the power transmission and reception of direct-current power. The battery servers 100a to 100d according to an embodiment of the present disclosure have the configuration as shown in FIG. 2, and thus it is possible to efficiently manage the right to control the power transmission and reception of direct-current power, thereby keeping the order of objects to be controlled among the battery servers.

The direct-current bus line 20 or the local bus lines 21a to 21d are not limited to the particular configuration. For example, the direct-current bus line 20 or the local bus lines 21a to 21d may be configured as a direct-current single-phase three-wire bus line having two lines supplied with positive voltage and negative voltage, and a line connected to the ground.

In the present embodiment, the GM-Agent of a battery server having a control right detects how each of the battery servers is connected to the direct-current bus line 20 using resistance components R12, R23, R34, R45, . . . depending on the thickness and length of a power cable used as the direct-current bus line 20. Although a specific processing procedure will be described in detail later, an overview thereof is described below.

The GM-Agent of a battery server, which has a control right, issues an instruction of charge or discharge to another battery server via the communication wire 30. This instruction is issued to the DC-to-DC converter through the C-Agent of the other battery server via the communication wire 30. The GM-Agent of the battery server having a control right reads the voltage value and current value from all of the DC-to-DC converters through the C-Agent 140a delivering the instruction, and estimates a connection state based on the amount of voltage drop to derive the connection configuration from the read voltage value and electric current value.

Similarly for other battery servers, the GM-Agent of a battery server, which has a control right, issues an instruction of charge or discharge to the DC-to-DC converter through the C-Agent of the other battery server. The GM-Agent then obtains the voltage value and current value by reading them from the DC-to-DC converter to derive the connection configuration. The GM-Agent repeats this process until all of the connection configuration expressions are completed.

The connection configuration expressions completed by the activated GM-Agent (having a control right) become a connection configuration as viewed from the activated GM-Agent. Thus, the GM-Agent converts the connection configuration expressions to match the position of each of the battery servers and then transmits the converted connection configuration expressions to the respective battery servers. The battery server registers the connection configuration expression transmitted from the activated GM-Agent. Thus, the DC-to-DC converter in each of the battery servers may function as one example of a voltage variation information acquisition unit according to an embodiment of the present disclosure. The activated GM-Agent may function as one example of a path information generation unit according to an embodiment of the present disclosure.

In some cases, a battery server is not connected to the direct-current bus line 20 or a battery server is unable to communicate, for example, due to trouble in a network. In these cases, it is not possible to acquire the voltage value and current value. Thus, the activated GM-Agent creates the connection configuration expression on the assumption that there is no such battery server.

An example of the connection configuration expression created by the activated GM-Agent will be described. FIGS. 3A to 3I are diagrams illustrated to describe an example of the connection configuration expression created by the activated GM-Agent.

The connection configuration expression (S-expression) represents the topology of nodes. The S-expression indicates the name of a node and the connection relationship between the node and a subsequent node. The symbol "( )" following a node indicates that the node is the termination.

When the connection configuration expression is created, the GM-Agent sets a node to a positive voltage source and sets another node to a negative voltage source. The voltage values of all of the nodes being recognized are measured through the power supply from the positive voltage source.

In the connection configuration expression according to the present embodiment, nodes having the same potential as a reference node are placed at a list of the same level, and nodes having a potential lower than the reference node are placed at a sub-list. The connection configuration expression according to the present embodiment is produced as a connection configuration expression of a sub-list in descending order of potential. A node, which has a voltage lower than a reference node and has a higher voltage than the electric current source, is borrowed by carrying with a symbol (*), and then is set to the electric current source and its voltage is re-checked.

The present embodiment is based on the assumption that the DC grid has a loop-free configuration.

FIG. 3A is the simplest example and illustrates an example of a case where the GM-Agent creates a connection configuration expression for two nodes N1 and N2. If the nodes N1 and N2 are set to a voltage of Vn1 and Vn2, respectively, and as a result of measuring them, the relationship of Vn1>Vn2 is established, the GM-Agent sets the connection configuration expression as follows:

(n1(n2( )))

FIG. 3B illustrates an example of a case where the GM-Agent creates a connection configuration expression for three nodes N1, N2, and N3. If the nodes N1, N2, and N3 are set to a voltage of Vn1, Vn2, and Vn3, respectively, and as a result of measuring them, the relationship of Vn1>Vn2 and Vn1=Vn3 is established, the GM-Agent sets the connection configuration expression as follows:

(n1(n2( ))(n3*))

FIG. 3C illustrates an example of a case where the GM-Agent creates a connection configuration expression for three nodes N1, N2, and N3. If the nodes N1, N2, and N3 are set to a voltage of Vn1, Vn2, and Vn3, respectively and as a result of measuring them, the relationship of Vn1>Vn3 and Vn2=Vn3 is established, the GM-Agent sets the connection configuration expression as follows:

(n1(n3n2*))

FIG. 3D illustrates an example of a case where the GM-Agent creates a connection configuration expression for three nodes N1, N2, and N3. If the nodes N1, N2, and N3 are set to a voltage of Vn1, Vn2, and Vn3, respectively and as a result of measuring them, the relationship of Vn1>Vn2>Vn3 is established, the GM-Agent sets the connection configuration expression as follows:

(n1(n2(n3( ))))

In this way, when the GM-Agent creates a connection configuration expression for three nodes N1, N2, and N3, the voltage is measured by setting the node N1 as a starting point and by setting the nodes N2 and N3 as a current sink. However, they may be sequentially replaced with a current source to prevent the power from being consumed unilaterally. In other words, if the GM-Agent specifies the node N1 as a current source in the initial measurement, the GM-Agent may specify the node N2 as a current source in the subsequent measurement and specify the node N3 as a current source in the next subsequent measurement. In this case, the GM-Agent is preferable to allow each node to absorb the current so that the power transfer between nodes upon the measurement of voltage is equal to each other as much as possible.

An example of creating the connection configuration expression for three nodes has been described. An example of creating a connection configuration expression for four nodes will be described.

FIG. 3E illustrates an example of a case where the GM-Agent creates a connection configuration expression for four nodes N1, N2, N3, and N4. If the nodes N1, N2, N3, and N4 are set to a voltage of Vn1, Vn2, Vn3, and Vn4, respectively, and as a result of measuring them, the relationship of Vn1>Vn2 and Vn1=Vn3=Vn4 is established, the GM-Agent sets the connection configuration expression as follows:

(n1(n2( )n3*n4*)

FIG. 3F illustrates an example of a case where the GM-Agent creates a connection configuration expression for four nodes N1, N2, N3, and N4. If the nodes N1, N2, N3, and N4 are set to a voltage of Vn1, Vn2, Vn3, and Vn4, respectively, and as a result of measuring them, the relationship of Vn1>Vn2 and Vn2=Vn3=Vn4 is established, the GM-Agent sets the connection configuration expression as follows:

(n1(n2n3*n4*))

FIG. 3G illustrates an example of a case where the GM-Agent creates a connection configuration expression for four nodes N1, N2, N3, and N4. If the nodes N1, N2, N3, and N4 are set to a voltage of Vn1, Vn2, Vn3, and Vn4, respectively, and as a result of measuring them, the relationship of Vn1>Vn2>Vn4 and Vn2=Vn3 is established, the GM-Agent sets the connection configuration expression as follows:

(n1(n2(n4( )))n3)

An example of creating the connection configuration expression for four nodes has been described. An example of creating a connection configuration expression for five nodes will be described.

FIG. 3H illustrates an example of a case where the GM-Agent creates a connection configuration expression for five nodes N1, N2, N3, N4, and N5. If the nodes N1, N2, N3, N4, and N5 are set to a voltage of Vn1, Vn2, Vn3, Vn4, and Vn5, respectively, and as a result of measuring them, the relationship of Vn1>Vn2>Vn4 and Vn2=Vn3=Vn5 is established, the GM-Agent sets the connection configuration expression as follows:

(n1(n2(n4( )))n3*n5*)

FIG. 3I illustrates an example of a case where the GM-Agent creates a connection configuration expression for five nodes N1, N2, N3, N4, and N5. If the nodes N1, N2, N3, N4, and N5 are set to a voltage of Vn1, Vn2, Vn3, Vn4, and Vn5, respectively, and as a result of measuring them, the relationship of Vn1>Vn3>Vn5 and Vn1=Vn2=Vn4 is established, the GM-Agent sets the connection configuration expression as follows:

(n1(n2(n4( )))(n3(n5( ))))

In this way, even when the number of nodes is increased, the GM-Agent can create a connection configuration expression from the voltage value of each node.

The connection configuration expression provided as described above is created with a viewpoint from a particular node. In the examples described above, all of the viewpoints are taken from the node N1. The GM-Agent converts the connection configuration expression with the viewpoint from the particular node into a connection configuration expression with a viewpoint from each node, and then distributes it to each node.

FIG. 4 is a diagram illustrated to describe an example of topology of nodes in the DC grid and an example of a connection configuration expression as viewed from each node.

Each node has, for example, a node name, a physical address, an operating mode of DC-to-DC converter, a set current, a set voltage, and so on, as information. A branch between nodes has, for example, a branch name, a branch current, and so on, as information. An example of the operating mode of DC-to-DC converter includes a mode of supplying power and a mode of receiving power.

When a connection configuration expression is created by setting a node as a starting point, the GM-Agent converts the connection configuration expression with a viewpoint from the particular node set as a starting point into a connection configuration expression with a viewpoint from each node. For example, in the example shown in FIG. 4, the connection configuration expression with the viewpoint from the node a0 is represented by Expression 1. To convert the connection configuration expression represented by Expression 1 into a connection configuration expression with a viewpoint from the node b0, the list of node a0 is taken out from its position and the list of the node b0 in the hierarchy is raised to the previous position of the node a0 so that the list of the node a0 is placed at a position lower than the node b0. The connection configuration expression converted to have the viewpoint from the node b0 is represented by Expression 2.

The GM-Agent can convert the connection configuration expression with the viewpoint from the node b0 into a connection configuration expression created by setting another node c0 as a starting point. For example, in the example shown in FIG. 4, the connection configuration expression with the viewpoint from the node b0 as represented by Equation 2 can be converted into a connection configuration expression with the viewpoint from the node c0 by taking out the list of the node b0 and raising the list of the node c0 so that the list of the node b0 is placed at a position lower than the node c0. The connection configuration expression converted to have the viewpoint from the node c0 is represented by Expression 3.

Similarly, the connection configuration expression with the viewpoint from the node a0 can be converted into a connection configuration expression with the viewpoint from another node, for example, in FIG. 4, a node f0 or node a1.

For example, to convert the connection configuration expression represented by Expression 1 into a connection configuration expression with a viewpoint from the node f0, the list of node a0 is taken out from its position and the list of the node f0 in the hierarchy is raised to the previous position of the node a0 so that the list of the node a0 is placed at a position lower than the node f0. The connection configuration expression converted to have the viewpoint from the node f0 is represented by Expression 4.

In addition, for example, to convert the connection configuration expression represented by Expression 1 into a connection configuration expression with a viewpoint from the node a1, the list of the node a0 is placed at a position lower than the node a1 by replacing the node a0 and the node a1. The connection configuration expression converted to have the viewpoint from the node a1 is represented by Expression 5.

The creation of a connection configuration expression as described above allows a battery server serving as a master to control the direct-current power to be efficiently transferred using the created connection configuration expression. In other words, in transferring power, the power is discharged or supplied by a plurality of nodes. In this case, a node that sets the voltage of the DC grid controls the current so that the voltage is maintained by making the total sum of the current flowing out and into the node equal to zero. The node that sets the voltage of the DC grid can calculate the sum of current by referring to the connection configuration expression when the current is controlled. Thus, the GM-Agent of each battery server may function as an example of a power controller according to an embodiment of the present disclosure.

An example of the connection configuration expression created by the activated GM-Agent has been described. An exemplary operation of the battery server according to an embodiment of the present disclosure will be described.

(1.3. Exemplary Operation)

FIGS. 5 to 7 illustrate an exemplary operation of the battery server according to an embodiment of the present disclosure. In FIGS. 5 to 7, an exemplary operation of the battery server according to an embodiment of the present disclosure in creating a connection configuration expression and in calculating each branch current.

An exemplary operation in creating a connection configuration expression will be described. FIGS. 5 and 6 illustrate an exemplary operation of the battery server according to an embodiment of the present disclosure. FIGS. 5 to 7 illustrate an exemplary operation in creating a connection configuration expression.

The overall procedure will be described with reference to FIG. 5. The GM-Agent of a battery server, which obtains a control right by arbitration with another battery server after its starting up, reads the registered node information (step S101). When the GM-Agent reads the registered node information, the GM-Agent determines whether the registration is changed, more specifically, whether there is a battery server that is newly joined in the DC grid or whether there is a battery server that is withdrawn from the DC grid (step S102).

If it is determined, in step S102, that no registration is changed (No in step S102), the GM-Agent determines whether there is a remeasurement instruction, more specifically, an instruction to measure again the resistance value of the DC grid (step S103). The remeasurement instruction may be issued periodically by a trigger based on a timer or may be issued manually by the user.

If it is determined, in step S103, that no remeasurement instruction is issued (No in step S103), the GM-Agent returns the process to step S102 to continue to perform the determination process.

On the other hand, if it is determined, in step S102, that the registration is changed (Yes in step S102) or if it is determined, in step S103, that the remeasurement instruction is issued (Yes in step S103), the GM-Agent measures the connection configuration (step S104). The GM-Agent measures the connection configuration to create the connection configuration expression. The measurement of the connection configuration will be described in detail later along with the description with reference to FIG. 6.

When the GM-Agent performs the measurement of the connection configuration, the GM-Agent determines whether the resistance value in the DC grid is abnormal (step S105). The determination of whether the resistance value in the DC grid is abnormal may be made, for example, by determining whether there is a difference between values in which a failure is believed to obviously occur by comparing a currently measured value and a previously measured value.

If it is determined, in step S105, that the resistance value in the DC grid is not abnormal (No in step S105), the GM-Agent converts the created connection configuration expression into a connection configuration expression with the viewpoint from each node (battery server) and transmits it to each node (step S106). The method of converting the connection configuration expression is as described above.

On the other hand, if it is determined, in step S105, that the resistance value in the DC grid is abnormal (Yes in step S105), the GM-Agent does not perform the conversion and transmission of the connection configuration expression, and then the process ends with an abnormal termination. When the resistance value in the DC grid is abnormal, the GM-Agent may perform a process for creating any possible alert indicating the occurrence of abnormality. The alert may be intended to appeal to the acoustic senses through sound or may be intended to appeal to the visual senses. The presentation and contents of the alert are not limited to a particular one.

The measurement process procedure of the connection configuration in step S104 will be described in detail with reference to FIG. 6.

The GM-Agent instructs all of the DC-to-DC converters (DCCs) capable of receiving the instruction to make the voltage constant and initializes internal data, that is, the connection configuration expression (step S111).

Then, the GM-Agent retrieves one node from the registered node information (step S112). When the GM-Agent retrieves one node from the registered node information, the GM-Agent determines whether there is remaining node information (step S113). If there is any remaining node information (Yes in step S113), the GM-Agent sets one of the DC-to-DC converters associated with a node address to the charge mode, measures the voltage and current values for all of the nodes at that time, and then calculates the resistance value (step S114).

When the GM-Agent measures the voltage and current values for all of the nodes and calculates the resistance value, the GM-Agent extracts the connection relationship from the difference in the measured voltage values for all of the nodes and establishes a temporary connection configuration expression (step S115). A method of establishing the connection configuration expression is as described above.

When the temporary connection configuration expression is established in step S115, the GM-Agent returns the process to the process of step S112 and retrieves other node information. The GM-Agent repeats the process of steps S112 to S115 until no node information is left. If there is no remaining node information (No in step S113), the GM-Agent integrates all of the temporary expressions and calculates the entire connection configuration expression (step S116).

A process for calculating an electric current flowing through each branch (branch current) will be described with reference to FIG. 7. The GM-Agent, when calculating the branch current, reads the connection configuration expression created by the process as described above (step S121).

When the connection configuration expression is read in step S121, the GM-Agent calculates the current of each branch based on the connection configuration expression and the current value set for each node (step S122).

When the current of each branch is calculated in step S122, the GM-Agent whether the current value of each branch exceeds an allowable value (step S123). If it is determined, in step S123, that the current value of each branch does not exceed an allowable value (No in step S123), the GM-Agent performs the process by considering the branch current to be within the allowable value. On the other hand, if it is determined, in step S123, that the current value of each branch exceeds an allowable value (Yes in step S123), the GM-Agent performs the process by considering the branch current to be out of the allowable value.

A method of calculating the current of each branch based on the connection configuration expression and the current value set for each node will be described. For example, in a case where each node of the DC grid is connected as shown in FIG. 4, the current value of each node is assumed to be set by the GM-Agent, as follows:

(def a0 {:a0 0})
(def a1 {:a1 −1})
(def b0 {:b0 2})
(def c0 {:c0 −3})
(def c1 {:c1 4})

(def d0 {:d0 -5})
(def d1 {:d1 6})
(def e0 {:e0 -7})
(def f0 {:f0 6})
(def f1 {:f1 -5})
(def g0 {:g0 4})

In the above, "(def (node name) {(node name) (value)})" indicates the command for assigning a current value set with "(value)" to the relevant node. In other words, in the command, for example, the node f0 is set to a current of 6 ampere, the node g0 is set to a current of 4 ampere, and the node f1 is set to a current of −5 ampere.

In this case, the connection configuration expression with the viewpoint from the node a0 is as represented by Expression 1 shown in FIG. 4, and thus it is found that the node f0 is connected to the nodes f1 and g0. Thus, if the branch current between the nodes f0 and g0 is −4 ampere as viewed from the node f0 and the branch current between the nodes f0 and f1 is 5 ampere as viewed from the node f0, the GM-Agent can calculate that the branch current between the nodes a0 and f0 is 5 ampere (−(4−5+6)=−5) as viewed from the node a0.

The calculation of the branch current as described above allows the GM-Agent to prevent a new connection resulting in a case where the current value exceeds a limit value from being established or prevent the new transmission and reception of power resulting in a case where the current value exceeds a limit value from being performed. In other words, the GM-Agent can block an instruction to perform the transmission and reception of power resulting in a case where the current value exceeds a limit value.

The activated GM-Agent, when measuring the connection configuration, may set the operation of the DC-to-DC converter for each node so that the current flows from a node having a right to control the direct-current bus line 20 (i.e. a node including the activated GM-Agent) to another node for a predetermined time (i.e. to allow the other node to charge a battery). However, when the GM-Agent measures the connection configuration, the relationship of voltage drop and the resistance value between nodes may be preferable to be separated from each other. Thus, the activated GM-Agent may set the operation of the DC-to-DC converter for each node so that the current flows from a node rather than the node having a control right for a predetermined time.

In this way, the activated GM-Agent sets the operation of the DC-to-DC converter for each node so that the current flows from a node rather than the node having a control right for a predetermined time, and thus it is possible to reduce unilateral loss of power due to the flow of current only from the node having a control right.

Furthermore, when the activated GM-Agent sets the operation of the DC-to-DC converter for each node so that the current flows from a node to another node for a predetermined time in measuring the connection configuration, the operation of the DC-to-DC converter may be set by replacing a power transmission node and a power reception node. The activated GM-Agent can measure the connection configuration while reducing the unilateral loss of power for each node by replacing discharge and power reception with each other at a node.

2. CONCLUSION

According to an embodiment of the present disclosure as described above, there is provided a battery server capable of creating the connection configuration expression relating to the connection topology between nodes by obtaining the voltage value from each node and distributing the generated connection configuration expression to another battery server.

The battery server according to an embodiment of the present disclosure creates the connection configuration expression and distributing the created connection configuration expression to another battery server, and thus it is possible to detect timely the connection configuration and to transmit it automatically to each battery server, without the necessity of setting the connection state between nodes for each battery server in advance.

In the exchange of power between battery servers, the current flowing through the power line becomes the maximum current value in the state where half of the connected battery servers are discharged at the maximum value and other half of the battery servers are charged at the maximum value. However, in practice, it can be assumed that the power transmission side and the power reception side are mixed together and thus the current is cancelled out, resulting in a reduction in the actual total current. The battery server according to an embodiment of the present disclosure creates the connection configuration expression and distributes the created connection configuration expression other battery servers, and thus it is possible to transmit and receive power efficiently. In addition, even when an electric wire having smaller current capacity is used, it is possible to achieve cost reduction in wiring material by devising the transmission control and to achieve cost reduction by capacity reduction in the cut-off breaker for security.

Furthermore, it is possible to control, as desired, the charge and discharge by the DC-to-DC converter provided in each of the battery servers. The battery server according to an embodiment of the present disclosure creates the connection configuration expression and distributes the created connection configuration expression other battery servers, and thus it is possible to control the power transmission and reception so as not to exceed the allowable value of the DC grid using the connection information. In addition, the power loss caused by the power transmission line can be calculated in advance, thus it is possible to select an appropriate power transmission destination to transmit power at a higher efficiency and to achieve the efficient exchange of power.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, the hardware configuration of each function block shown in functional block diagrams allows a series of processes to be implemented in hardware.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) A system including: circuitry configured to acquire information indicating a variation in voltage corresponding to each of a plurality of nodes connected to a direct-current (DC) line; and identify a topology of the plurality of nodes connected to the DC line based on the acquired information indicating the variation in voltage corresponding to each of the plurality of nodes.

(2) The system of (1), wherein the system comprises the plurality of nodes.

(3) The system of any of (1) to (2), wherein the system is a server in one of the plurality of nodes.

(4) The system of any of (1) to (3), wherein each of the plurality of nodes include a battery configured to supply power via the DC line.

(5). The system of any of (1) to (4), wherein each of the plurality of nodes comprise a bidirectional DC-to-DC converter configured to be coupled to the DC line.

(6) The system of (5), wherein each of the bidirectional DC-to-DC converters are configured to: convert a voltage of power supplied to the DC line by a battery provided in each of the plurality of nodes; and convert a voltage of power provided by the DC line to each of the nodes.

(7) The system of any of (1) to (6), further including: a communication interface configured to communicate with each of the plurality of nodes connected to the DC line.

(8) The system of any of (1) to (7), further including: a battery; and a communication interface, wherein the circuitry is configured to control the communication interface to transmit a request to receive power when a state of charge of the battery falls below a predetermined threshold value.

(9) The system of any of (1) to (8), further including: a battery; and a communication interface configured to receive a request to provide power from one of the plurality of nodes, wherein the circuitry is configured to control providing power to the node via the DC line when a state of charge of the battery exceeds a predetermined threshold value.

(10) The system of any of (1) to (9), further including: a communication interface, wherein the circuitry is configured to control the communication interface to issue a command to the plurality of nodes to maintain a constant voltage value prior to identifying the topology of the plurality of nodes.

(11) The system of any of (1) to (10), wherein the circuitry is configured to identify a first node of the plurality of nodes based on registered node information.

(12) The system of (11), wherein the circuitry is configured to: set the first node to charge mode; measure first voltage and current values corresponding to each of the plurality of nodes; and calculate a first resistance value corresponding to the DC line based on the first voltage and current values.

(13) The system of (12), wherein the circuitry is configured to: generate a first temporary topology of the plurality of the nodes based on a difference in measured first voltage values corresponding to each of the plurality of nodes.

(14) The system of (13), wherein the circuitry is configured to determine whether identification information corresponding to a second node exist in the registered node information.

(15) The system of (13), wherein the temporary topology is determined as the identified topology when identification information corresponding to a second node does not exist in the registered node information.

(16) The system of (14), wherein, when it is determined that identification information corresponding to the second nodes exists in the registered node information, the circuitry is configured to: set the second node to charge mode; measure second voltage and current values corresponding to each of the plurality of nodes; and calculate a second resistance value corresponding to the DC line based on the first voltage and current values.

(17) The system of (16), wherein the circuitry is configured to: generate a second temporary topology of the plurality of the nodes based on a difference in measured second voltage values corresponding to each of the plurality of nodes.

(18) The system of (17), wherein the circuitry is configured to generate the identified topology of the plurality of nodes based on the first temporary topology and the second temporary topology.

(19) The system of any of (1) to (18), wherein the circuitry is configured to: set each of the plurality of nodes to charge modes during different time periods; and for each time period, measure voltage and current values corresponding to each of the plurality of nodes; calculate resistance values corresponding to the DC line based on the voltage and current values; and generate temporary topologies of the plurality of nodes for each of the different time periods.

(20) The system of (19), wherein the circuitry is configured to generate the identified topology of the plurality of nodes based on the generated temporary topologies of the plurality of nodes for each of the different time periods.

(21) One or more non-transitory computer-readable media including computer program instructions, which when executed by a system cause the system to: acquire information indicating a variation in voltage corresponding to each of a plurality of nodes connected to a direct-current (DC) line; and identify a topology of the plurality of nodes connected to the DC line based on the acquired information indicating the variation in voltage corresponding to each of the plurality of nodes.

(22) A method performed by an information processing system, the method comprising: acquiring information indicating a variation in voltage corresponding to each of a plurality of nodes connected to a direct-current (DC) line; and identifying a topology of the plurality of nodes connected to the DC line based on the acquired information indicating the variation in voltage corresponding to each of the plurality of nodes.

REFERENCE SIGNS LIST 1 power transmission and reception control system
10a to 10d customer
20 direct-current bus line
21a to 21d local bus line
30, 30a, 30b communication wire
100a to 100d battery server
150a to 150d DC-to-DC converter
160a to 160d battery
170a to 170d scenario
180 policy
200a to 200d solar panel

The invention claimed is:
1. A system comprising:
circuitry configured to
acquire information indicating a variation in voltage corresponding to each of a plurality of nodes connected to a direct-current (DC) line; and
identify a topology of the plurality of nodes connected to the DC line based on the acquired information indicating the variation in voltage corresponding to each of the plurality of nodes,
wherein each of the plurality of nodes comprises a bidirectional DC-to-DC converter configured to be coupled to the DC line, and each of the plurality of nodes comprises a battery capable of supplying power via the DC line.

2. The system of claim 1, wherein
the system comprises the plurality of nodes.

3. The system of claim 1, wherein
the system is a server in one of the plurality of nodes.

4. The system of claim 1, wherein each of the bidirectional DC-to-DC converters are configured to:
convert a voltage of power supplied to the DC line by the battery provided in each of the plurality of nodes; and
convert a voltage of power provided by the DC line to each of the nodes.

5. The system of claim 1, further comprising:
a communication interface configured to communicate with each of the plurality of nodes connected to the DC line.

6. The system of claim 1, further comprising:
a communication interface, wherein
the circuitry is configured to control the communication interface to transmit a request to receive power when a state of charge of at least one of the batteries falls below a predetermined threshold value.

7. The system of claim 1, further comprising:
a communication interface configured to receive a request to provide power from one of the plurality of nodes, wherein
the circuitry is configured to control providing power to the node via the DC line when a state of charge of at least one of the batteries exceeds a predetermined threshold value.

8. The system of claim 1, further comprising:
a communication interface, wherein
the circuitry is configured to control the communication interface to issue a command to the plurality of nodes to maintain a constant voltage value prior to identifying the topology of the plurality of nodes.

9. The system of claim 1, wherein
the circuitry is configured to identify a first node of the plurality of nodes based on registered node information.

10. The system of claim 9, wherein the circuitry is configured to:
set the first node to charge mode;
measure first voltage and current values corresponding to each of the plurality of nodes; and
calculate a first resistance value corresponding to the DC line based on the first voltage and current values.

11. The system of claim 10, wherein the circuitry is configured to:
generate a first temporary topology of the plurality of the nodes based on a difference in measured first voltage values corresponding to each of the plurality of nodes.

12. The system of claim 11, wherein
the circuitry is configured to determine whether identification information corresponding to a second node exist in the registered node information.

13. The system of claim 12, wherein, when it is determined that identification information corresponding to the second nodes exists in the registered node information, the circuitry is configured to:
set the second node to charge mode;
measure second voltage and current values corresponding to each of the plurality of nodes; and
calculate a second resistance value corresponding to the DC line based on the first voltage and current values.

14. The system of claim 13, wherein the circuitry is configured to:
generate a second temporary topology of the plurality of the nodes based on a difference in measured second voltage values corresponding to each of the plurality of nodes.

15. The system of claim 14, wherein
the circuitry is configured to generate the identified topology of the plurality of nodes based on the first temporary topology and the second temporary topology.

16. The system of claim 11, wherein
the temporary topology is determined as the identified topology when identification information corresponding to a second node does not exist in the registered node information.

17. The system of claim 1, wherein the circuitry is configured to:
set each of the plurality of nodes to charge modes during different time periods; and
for each time period,
measure voltage and current values corresponding to each of the plurality of nodes;
calculate resistance values corresponding to the DC line based on the voltage and current values; and
generate temporary topologies of the plurality of nodes for each of the different time periods.

18. The system of claim 17, wherein
the circuitry is configured to generate the identified topology of the plurality of nodes based on the generated temporary topologies of the plurality of nodes for each of the different time periods.

19. One or more non-transitory computer-readable media including computer program instructions, which when executed by a system cause the system to:
acquire information indicating a variation in voltage corresponding to each of a plurality of nodes connected to a direct-current (DC) line; and
identify a topology of the plurality of nodes connected to the DC line based on the acquired information indicating the variation in voltage corresponding to each of the plurality of nodes,
wherein each of the plurality of nodes comprises a bidirectional DC-to-DC converter configured to be coupled to the DC line, and each of the plurality of nodes comprises a battery capable of supplying power via the DC line.

20. A method performed by an information processing system, the method comprising:
acquiring information indicating a variation in voltage corresponding to each of a plurality of nodes connected to a direct-current (DC) line; and
identifying a topology of the plurality of nodes connected to the DC line based on the acquired information indicating the variation in voltage corresponding to each of the plurality of nodes, wherein each of the plurality of nodes comprises a bidirectional DC-to-DC converter configured to be coupled to the DC line, and each of the plurality of nodes comprises a battery capable of supplying power via the DC line.

* * * * *